United States Patent

Möhring et al.

[11] Patent Number: 5,093,376
[45] Date of Patent: Mar. 3, 1992

[54] METHOD FOR THE PREPARATION OF FLEXIBLE POLYESTER POLYURETHANE FOAMS

[75] Inventors: Volker Möhring, Muelheim/Ruhr; Volker Zellmer, Bottrop; Georg Burkhart, Essen; Jürgen Fock, Duesseldorf; Hans-Heinrich Schlöns, Essen, all of Fed. Rep. of Germany

[73] Assignee: Th. Goldschmidt AG, Essen, Fed. Rep. of Germany

[21] Appl. No.: 554,696

[22] Filed: Jul. 18, 1990

[30] Foreign Application Priority Data

Jul. 20, 1989 [DE] Fed. Rep. of Germany ....... 3924082

[51] Int. Cl.$^5$ .................. C08J 9/08; C08L 75/06; C08G 18/06
[52] U.S. Cl. .................. 521/110; 521/111; 521/112; 521/129; 521/137; 521/159
[58] Field of Search .............. 521/111, 112, 129, 137, 521/159, 110

[56] References Cited

U.S. PATENT DOCUMENTS

| | | | |
|---|---|---|---|
| 4,038,210 | 7/1977 | Rosemund et al. | 521/129 |
| 4,088,615 | 5/1978 | Sander et al. | 521/111 |
| 4,331,555 | 5/1982 | Baskent et al. | 252/351 |
| 4,478,960 | 10/1984 | Buethe et al. | 521/159 |
| 4,542,165 | 9/1985 | Kumato et al. | 521/137 |
| 4,931,483 | 6/1990 | Matsuoka et al. | 521/137 |

FOREIGN PATENT DOCUMENTS

| | | |
|---|---|---|
| 1178595 | 9/1964 | Fed. Rep. of Germany . |
| 1813198 | 12/1968 | Fed. Rep. of Germany . |
| 2041659 | 8/1970 | Fed. Rep. of Germany . |
| 2348929 | 9/1973 | Fed. Rep. of Germany . |
| 3339068 | 6/1984 | Fed. Rep. of Germany . |

*Primary Examiner*—John Kight, III
*Assistant Examiner*—John M. Cooney, Jr.
*Attorney, Agent, or Firm*—Toren, McGeady & Associates

[57] ABSTRACT

A method is disclosed for the preparation of flexible polyester polyurethane foam by reaction of at least difunctional polyesterols with at least difunctional organic isocyanates in the presence of catalysts and a stabilizer mixture of organic and organosilicon compounds, water, optionally blowing agents and optionally conventional additives, wherein the stabilizer mixture used comprises a) a (meth)allyl polyoxyalkylene ether polymer or its copolymer with vinyl monomers and
b) a polyoxyethylene-polysiloxane block copolymer, in a ratio by weight of a:b of 1:9 to 9:1. The polyester foam obtained are open celled to a high degree and have an excellent die-cuttability.

9 Claims, No Drawings

METHOD FOR THE PREPARATION OF FLEXIBLE POLYESTER POLYURETHANE FOAMS

BACKGROUND OF THE INVENTION

This invention relates to a method for the preparation of flexible polyester polyurethane foam by reaction of at least difunctional polyesterols with at least difunctional organic isocyanates in the presence of a catalyst and a stabilizer mixture of organic and organosilicon compounds, water, optionally blowing agents and optionally conventional additives. More particularly, this invention relates to the use of a particularly advantageous stabilizer mixture for the preparation of flexible polyester polyurethane foams.

According to the present state of the art, basically the following types of stabilizers come into consideration.

Organic Surfactants

Because of their weak stabilizing capability, strictly organic surfactants are regarded more as emulsifiers than as stabilizers in the original sense. Therefore, they primarily assume the task of nucleation, which, in ester foams, usually leads to the desired fine and regular cells. In addition, they are used when adhesion of the edges of molded articles made from polyurethane foams is to be avoided when these articles are punched out.

Because of the slight stabilizing action of organic surfactants, it is practically impossible to produce polyester urethane foams with a relatively low density (such as less than 25 kg/m$^3$) using only organic surfactants. With decreasing density, irregular cell structures as well as a deficient capability to hold the propellant gas are observed and, with that, extensive settling of the foams.

It is difficult, moreover, to produce foams with a high density (such as more than 60 kg/m$^3$) with strictly organic surfactants without undesirable shrinkage. Examples of such products are anionic surfactants, such as the salts of fatty acids, sulfonated fatty acids or sulfated fatty alcohols, as well as nonionic surfactants, such as the alkoxylated products of fatty alcohols or alkylphenols.

Polyether-Siloxane Copolymers

As is known from other polyurethane foams, such as flexible polyether polyurethane foams, polyoxyalkylene-polysiloxane block copolymers have pronounced stabilizing properties, which are all the more important, the lower the desired density. The use of such polyoxyalkylene-polysiloxane block copolymers alone, therefore permits foams to be produced without any loss of gas or settling worth mentioning and, at the same time, with good density distribution.

However, because of their slight emulsifying capability, the polyoxyalkylene-polysiloxane block copolymers, when used as sole stabilizer component in the ester foam, provide only inadequate nucleation. This leads to a very coarse and irregular foam structure.

Because of the stabilizing properties and, with that, the tendency to form closed cells (shrinkage), the production of ester foams of high density is difficult.

It is also a complicating factor that, in contrast to the strictly organic surfactants, ester foams, which can be punched without adhesion of the edges, cannot be obtained when polyoxyalkylene-polysiloxane block copolymers are used.

Stabilizer Mixtures

Therefore, corresponding to the state of the art, mixtures of polyoxyalkylene-polysiloxane block copolymers and organic surfactants are preferably used as stabilizers for the production of flexible polyester polyurethane foams, because only such mixtures are universally usable within certain limits.

Such stabilizer mixtures are described in a plurality of Offenlegungsschriften and patents. The object of German Offenlehgungsschrift 18 13 198 is a method for the preparation of flexible polyester urethane foams with the feature that, as the surface active stabilizer, a small amount of an anionic organic foam stabilizer, which is soluble in the polyester resin at room temperature, which lowers the surface tension of the polyester resin by at least 5 dynes per cm when dissolved therein, and which is neither a water insoluble sulfonate nor a water insoluble sulfonic acid, is used together with a small amount of a foam stabilizing siloxane-polyoxyalkylene block copolymer with a molecular weight of 600 to 17,000, a siloxane content of 14 to 40% by weight, based on the weight of the block copolymer, and an oxyethylene content of at least 75% by weight, based on the total number of the oxyalkylene groups in the block copolymer.

German Offenlegungsschrift 11 78 595 is directed to the use of a stabilizer mixture consisting of a polyoxyalkylene-polysiloxane block copolymer and the alkali salt of a castor oil sulfate. Further, German Offenlegungsschrift 23 48 929, U.S. Pat. No. 4,088,615 and U.S. Pat No. 4,331,555 can be mentioned as belonging to the state of the art.

With the stabilizer mixture of the state of the art, one is basically in a position to produce polyester polyurethane foams over a wide range of densities with uniformly fine cells and a sufficient degree of open-cell structure. However, it is a disadvantage of these foams that they can be punched out only inadequately, owing to the fact that the edges of the polyester polyurethane foam article adhere when the molded article is punched out.

Attempts have already been made to improve the ability to punch out such foamed materials by the addition of paraffin oils or low molecular weight polyols, as described, for example, in U.S. Pat. No. 4,088,615. However, this in turn requires additional adaptation, that is, a change in the foaming formulation. In addition, other physical properties of the foams are affected by such additives.

SUMMARY OF THE INVENTION

It is an object of invention to provide a universally usable stabilizer mixture for the production of flexible polyester polyurethane foams, which combines the advantages of an organic surfactant with those of a polyoxyalkylene-polysiloxane block copolymer.

Another object of the invention is to provide a universally usable stabilizer mixture for the production of flexible polyester polyurethane foams whereby the inadequate ability of punching out the foams is improved significantly without the occurrence of the aforementioned disadvantages.

A further object of the invention is to provide a universally usuable stabilizer mixture for the production of flexible polyester polyurethane foams, whereby the foam products have an open cell structure to a particularly high degree, which goes beyond the degree of open cell structure achievable with previous stabilizer mixtures.

Surprisingly, these objectives and others are achieved by the invention, according to which, a stabilizer mixture is used for the production of flexible polyester polyurethane foams which comprises
   a) a (meth)allyl polyoxyalkylene ether polymer or its copolymer with vinyl monomers and
   b) a polyoxyalkylene-polysiloxane block copolymer,
wherein the ratio by weight of a : b is 1 : 9 to 9 : 1.

DESCRIPTION OF THE INVENTION

Preferably the ratio by weight of a : b is 3 : 1 to 1 : 3.

As component a), a copolymer of (meth)allyl polyoxyalkylene ethers, and vinyl monomers, such as vinyl esters of carboxylic acids, is preferably used. Methods for the preparation of component a) are disclosed in German Patent 33 39 068 and German Offenlegungsschrift 20 41 659.

The polyoxyalkylene-polysiloxane block copolymer may be linear or branched or have a comb-like structure. The polyoxyalkylene blocks are linked to the polysiloxane backbone by an SiC or an SiOC bond. Those skilled in the art of producing polyurethane foams are familiar with such block copolymers from the art.

Preferably, a stabilizer mixture is used wherein component a) is obtained by the polymerization of compounds of the general formula

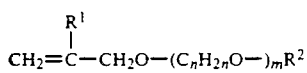

$$CH_2=\overset{R^1}{\underset{|}{C}}-CH_2O-(C_nH_{2n}O-)_mR^2 \qquad I$$

or by the copolymerization of these compounds with up to 90 mole percent of vinyl compounds of the general formula

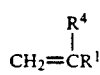

$$CH_2=CR^1\overset{R^4}{\underset{|}{}} \qquad II$$

wherein
   $R^1$ is a hydrogen or methyl group
   $R^2$ is a hydrogen group or a hydrocarbon group with 1 to 8 carbon atoms or the —CONH—$R^3$ or —CO—$R^3$ group, in which $R^3$ is a hydrocarbon group with 1 to 8 carbon atoms,
   $R^4$ is the $R^5$—COO— or the —COO$R^5$ group or

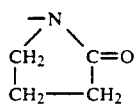

$$\begin{array}{c} -N \\ / \quad \backslash \\ CH_2 \quad C=O \\ | \quad\quad | \\ CH_2 \text{——} CH_2 \end{array}$$

in which $R^5$ is an alkyl group with 1 to 18 carbon atoms,
n has a value of 2 to 3 in the average polymer molecule and an absolute numerical value of 2, 3 or 4 and
m has a value of 1 to 100 in the average polymer molecule.

Particularly preferred is the use of polymers, in which $R^1$ is a hydrogen group. $R^2$ preferably is a hydrocarbon group with 1 to 4 carbon atoms.

$R^4$ preferably represents a $R^5$—COO— or —COO$R^5$ group, wherein $R^5$, in particular, is a methyl or ethyl group.

In the average polymer molecule, n has a value of 2 to 3 and preferably a value of 2.2 to 2.8. The absolute numerical values of n are 2, 3 or 4. Oxyalkylene groups wherein n=2 and n=3, that is, oxyethylene and oxypropylene groups are preferred.

In the average molecule, m has a value of 1 to 100 and preferably a value of 10 to 70.

Furthermore, it is preferred to use, as component b), a block copolymer of the general formula

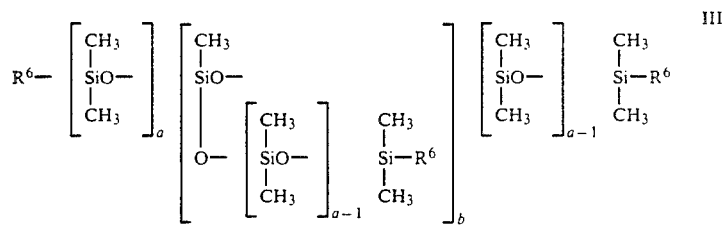

or of the general formula

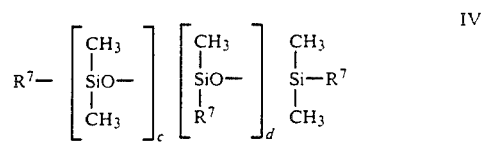

wherein
   $R^6$ is a methyl group or a polyether group of the average formula —O—$(C_xH_{2x}O-)_yR^8$, in which
   x has a value of 2 to 3 in the average polymer molecule and an absolute numerical value of 2, 3 or 4,
   y has a value of 5 to 50 in the average polymer molecule and
   $R^8$ is a hydrogen or alkyl group with 1 to 6 carbon atoms,
   $R^7$ is a methyl group or a polyether group of the general average formula —$(CH_2)_3O-(C_pH_{2p}O-)_qR^9$ in which
   p has a value of 2 to 3 in the average polymer molecule and an absolute numerical value of 2, 3 or 4,
   q has a value of 5 to 50 in the average polymer molecule and
   $R^9$ is a hydrogen or alkyl group with 1 to 6 carbon atoms,
with the proviso that, in the average polymer molecule, at least one $R^6$ or $R^7$ group must be a polyether group.

In the average polymer molecule:
   a has a value of 1 to 50,
   b has a value of 0 to 10,
   c has a value of 2 to 50,
   d has a value of 2 to 40.

$R^8$ and $R^9$ are preferably alkyl groups with 1 to 4 carbon atoms.

Also in the average polymer molecule, x has a value of 2 to 3 and preferably a value of 2.0 to 2.7. The absolute numerical value of x is 2, 3 or 4, but 2 or 3 is preferred. The corresponding values of the subscript p are the same as for x. The subscripts y and q in the average polymer molecule each have a value of 5 to 50 and preferably a value of 8 to 40.

The condition must be fulfilled that, in the average polymer molecule, at least one $R^6$ or $R^7$ group is a polyether group. Preferably, 2 to 30 polyether groups are linked to the polysiloxane frame work in the average polymer molecule. The polyether groups can be the same or different.

Further, in the average polymer molecule, a preferably has a value of 2 to 20; b preferably has a value of 0 to 2; c preferably has a value of 2 to 25 and d preferably has a value of 2 to 25.

In practice, the stabilizer mixture is dissolved together with the catalyst in the water required for foaming. To improve the solubility in water, it is frequently of advantage to add a solubilizing agent in effective amounts to this composition. Examples of such solubilizing agents are alkylphenyl polyoxyalkylene ethers, alkyl polyoxyalkylene ethers or oxyalkylene block copolymers. Depending on the catalyst used, the solubilizing agents are usually added in amounts of 5 to 70% by weight of the stabilizer mixture. The flexible polyester polyurethane foams produced using the inventive stabilizer mixture are open celled to a high degree. They can be punched out outstandingly well without any adhesion, particularly in the edge regions, which, in prior products, are disadvantageous from an industrial applications point of view.

The method of the invention and the properties of the foams produced thereby are described in greater detail in the following examples which further illustrate the best mode currently contemplated for carrying out the invention, but which must not be construed as limiting the invention in any manner.

The following products and product names are used in the examples.

Desmophen ® 2200: a conventional, commercial polyester polyol for producing flexible polyester polyurethane foams, prepared from adipic acid and diethylene glycol, as well as small amounts of higher functional alcohols. The hydroxyl number usually is 45 to 65 and functionality is at least 2.

Desmodur ®T 80: conventional commercial toluylene diisocyanate, characterized by an 80:20 ratio of the 2,4 to 2,6 isomers.

Desmodur ®T65: conventional commercial toluylene diisocyanate, characterized by an 65:35 ratio of the 2,4 to 2,6 isomers.

NMM: N-methylmorpholine.

DB: N,N-dimethylbenzylamine.

NP 9: ethoxylated nonylphenol with, on the average, 9 ethylene oxide units.

EM/TX: EM = a nonionic surfactant based on alkoxylated fatty alcohols. TX = an anionic surfactant.

Tegostab ®B 8300: a conventional, commercial stabilizer for the production of flexible polyester polyurethane foams; it is based on polyoxyalkylene-poly siloxane block copolymers in admixture with organic surfactants (sodium dodecylsulfonate and NP 9).

Niax ®L 532: a conventional, commercial stabilizer for the production of flexible polyester polyurethane foams based on polyoxyalkylene-polysiloxane block copolymers in admixture with organic surfactants.

Siloxane 1: a polyoxyalkylene-polysiloxane block copolymer of formula IV, wherein $R^7$ (terminal) is a methyl group and $R^7$ (lateral) is a polyether group. Moreover, $c=9$, $d=10$, $p=2.1$, $q=12$ and $R^9$ is methyl and the absolute numerical values of p are 2 and 3.

Siloxane 2: a polyoxyalkylene-polysiloxane block copolymer of formula III, wherein $R^6$ is a polyether group. Moreover, $a=4$, $b=0$, $x=2.3$, $y=37$, $R^8$ is butyl and the absolute numerical values of x are 2 and 3.

Siloxane 3: a polyoxyalkylene-polysiloxane block copolymer of formula III, wherein $R^6$ is a polyether group. Moreover, $a=1.5$, $b=1$, $x=2.6$, $y=17$, $R^8$ is methyl and the absolute numerical values of x are 2 and 3.

Siloxane 4: a polyoxyalkylene-polysiloxane block copolymer of formula IV, wherein $R^7$ is a polyether group. Moreover, $c=19$, $d=20$, $p=2.6$, $q=34$, $R^9$ is methyl and the absolute numerical values of x are 2 and 3.

The foams are prepared on a Hennecke high-pressure machine with a maximum output of 10 kg of polyester polyol per minute, which corresponds to the state of the art. The liquid reaction mixture was foamed directly from the mixing head in an open vessel with the dimensions of 30 cm × 30 cm × 30 cm, so that the foam was free to rise. In the experiments, the amount of isocyanate was 90 to 110% of the amount required for the reaction with the polyester and the water present in the reaction mixture, expressed by an index of <90> to <110>. The preferred index was <100>.

The physical properties of the foam were determined after a 72-hour storage at a normal temperature and humidity, that is at 23°±1° C. and 50±2% relative humidity.

The following properties were determined:

1. Air Permeability

The Degree to Which the Cells are Open

This is understood to be the back pressure in a column of water, which results when a uniform current of air of 8 L/min is passed through the foam. Low values indicate that the air permeability and therefore the degree to which the cells are open are good. On the other hand, high values correspond to a high proportion of closed cells.

2. Cell Structure

This can vary between fine to coarse and regular to irregular and is evaluated visually. The aim is to have as fine and, at the same time, as regular a cell as possible.

3. Die-Cuttability

For this, test pieces are punched out in accordance with DIN 53571 and rated visually from very good to very poor. Very good means that the test piece shows absolutely no adhesion of the edges immediately after the stamping-out process. On the other hand, if the stamping out behavior is very poor, the edges of the test piece remain irreversibly glued in the long run.

TABLE 1

| | Formulations | | | | | | | | | |
|---|---|---|---|---|---|---|---|---|---|---|
| | Example 1 | Example 2 | Example 3a | Example 3b | Example 4a-j | Example 5 | Example 6 | Example 7a | Example 7b | Example 8k-t |
| Desmophen ® 220 | 100 | 100 | 100 | 100 | 100 | 100 | 100 | 100 | 100 | 100 |
| Water | 3.6 | 3.6 | 3.6 | 3.6 | 3.6 | 5.0 | 5.0 | 5.0 | 5.0 | 5.0 |
| NMM | 1.5 | 1.5 | 1.5 | 1.5 | 1.5 | — | — | 1.5 | 1.5 | 1.5 |
| DB | — | — | — | — | — | 1.5 | 1.5 | — | — | — |
| Desmodur ® T 80 | 44.8 | 44.8 | 44.8 | 44.8 | 44.8 | 40.8 | 40.8 | 40.8 | 40.8 | 40.8 |
| Desmodur ® T 65 | — | — | — | — | — | 17.5 | 17.5 | 17.5 | 17.5 | 17.5 |
| <Index> | 100 | 100 | 100 | 100 | 100 | 100 | 100 | 100 | 100 | 100 |
| Tegostab ® B 8300 | 1.0 | — | — | — | — | 1.0 | — | — | — | — |
| Niax ® L 532 | — | 1.0 | — | — | — | — | 1.0 | — | — | — |
| EM/TX (1:1) | — | — | 1.0 | 2.0 | — | — | — | 2.0 | 4.0 | — |
| Stabilizer Mixture of Table 3 | — | — | — | — | 1.0 | — | — | — | — | 1.0 |

The data is given in % by weight.

TABLE 2

Polymers Used in the Foaming Examples 4a-j and 8k-t (Corresponding to Component a))

| | (Meth)allyl polyoxyalkylene ether (A) $CH_2=CR^1-CH_2-O-(C_nH_{2n}O)_m-R^2$ | | | | | Vinyl Compound (B) $CH_2=CR^1-R^4$ | | | A:B |
|---|---|---|---|---|---|---|---|---|---|
| No. | R1 | R2 | R3 | n | m | R1 | R4 | R5 | (moles) |
| p-1 | H | $CH_3$ | — | 2.5 | 40 | — | — | — | — |
| p-2 | $CH_3$ | $CH_3$ | — | 2.5 | 40 | — | — | — | — |
| p-3 | H | $CH_3$ | — | 2.5 | 40 | H | $-O-CO-R^5$ | $CH_3$ | 1:3 |
| p-4 | $CH_3$ | $CH_3$ | — | 2.5 | 40 | H | $-O-CO-R^5$ | $CH_3$ | 1:3 |
| p-5 | H | $CH_3$ | — | 2.5 | 40 | H | $-COO-R^5$ | $C_4H_9$ | 1:2 |
| p-6 | H | $CH_3$ | — | 2.5 | 40 | $CH_3$ | $-COO-R^5$ | $CH_3$ | 1:2 |
| p-7 | H | $CH_3$ | — | 2.5 | 40 | H | $-N-(CH_2)_3-CO$ (cyclic) | — | 1:3 |
| p-8 | H | H | — | 2.5 | 40 | H | $-O-CO-R^5$ | $CH_3$ | 1:3 |
| p-9 | H | $C_4H_9$ | — | 2.5 | 40 | H | $-O-CO-R^5$ | $CH_3$ | 1:3 |
| p-10 | H | $-CO-R^3$ | $CH_3$ | 2.5 | 40 | H | $-O-CO-R^5$ | $CH_3$ | 1:3 |
| p-11 | H | $-CO-NH-R^3$ | $C_6H_5$ | 2.5 | 40 | H | $-O-CO-R^5$ | $CH_3$ | 1:3 |
| p-12 | H | $CH_3$ | — | 2.2 | 35 | H | $-O-CO-R^5$ | $CH_3$ | 1:2 |
| p-13 | H | $CH_3$ | — | 2.8 | 60 | H | $-O-CO-R^5$ | $CH_3$ | 1:3 |
| p-14 | H | $CH_3$ | — | 2.5 | 12 | H | $-O-CO-R^5$ | $CH_3$ | 3:1 |
| p-15 | H | $CH_3$ | — | 2.5 | 73 | H | $-O-CO-R^5$ | $CH_3$ | 1:5 |
| p-16 | H | $CH_3$ | — | 2.5 | 40 | H | $-O-CO-R^5$ | $CH_3$ | 1:1 |

TABLE 3

Stabilizer Mixtures Used in the Foaming Examples 4a-j and 8k-t, the Stabilizer Mixture Finally Used Additionally Containing 40% by Weight of Solubilizer NP 9

| Stabilizer Mixture | Component a) Table 2) | Component b) | a):b) % by weight |
|---|---|---|---|
| a | p-1 | Si-1 | 1:1 |
| b | p-2 | Si-1 | 1:1 |
| c | p-3 | Si-1 | 1:1 |
| d | p-3 | Si-2 | 1:1 |
| e | p-3 | Si-3 | 1:3 |
| f | p-3 | Si-4 | 3:1 |
| g | p-4 | Si-1 | 1:7 |
| h | p-5 | Si-1 | 1:1 |
| i | p-6 | Si-1 | 1:1 |
| j | p-7 | Si-1 | 1:1 |
| k | p-8 | Si-1 | 1:1 |
| l | p-9 | Si-1 | 6:1 |
| m | p-10 | Si-1 | 1:1 |
| n | p-11 | Si-1 | 1:1 |
| o | p-12 | Si-1 | 1:2 |
| p | p-13 | Si-1 | 1:1 |
| q | p-14 | Si-1 | 1:1 |
| r | p-15 | Si-1 | 1:1 |
| s | p-16 | Si-1 | 1:1 |
| t | p-3 | — | — |

TABLE 4

| | Results | | |
|---|---|---|---|
| Example | Air Permeability | Cell Structure | Die-Cuttability |
| 1 | 80 | fine, regular | very poor |
| 2 | 100 | fine, regular | very poor |
| 3a | | collapse, because of deficient stabilization | |
| 3b | 250 | fine, regular | very good |
| 4a | 50 | fine, regular | very good |
| b | 50 | fine, regular | very good |
| c | 10 | fine, regular | very good |
| d | 10 | fine, regular | very good |
| e | 25 | fine, regular | good/satisfactory |
| f | 20 | fine, regular | good/very good |
| g | 10 | fine, regular | satisfactory |
| h | 25 | slightly coarsened, regular | very good |
| i | 25 | slightly coarsened, regular | very good |
| j | 50 | fine, regular | good |

Examples 1 and 2 show that, when conventional, commercial stabilizers based on polyoxyalkylene-polysiloxane block copolymers are used in admixture with organic surfactants, foams with a fine and regular cell structure are obtained, which have an average air permeability but rate very poorly in the test of the die-cuttability.

Example 3b shows that, when strictly organic surfactants are used, foams with a fine and regular cell structure result, with an excellent die-cuttability, while the degree to which the cells are open is still satisfactory. The air permeability, which is barely acceptable, proves that foams without shrinkage cannot be produced with formulations having a low water content (high density).

The slight stabilizing action of the organic surfactants makes it necessary that they be used in higher concentrations. FIG. 3a accordingly shows that the addition of small amounts of these surfactants leads to a collapse of the foams.

Examples 4a–j confirm that when the inventive stabilizer mixture is used, it is possible to produce foams which have a fine and regular cell structure and an excellent die-cuttability. At the same time, the stabilization is good, as required. Moreover, the degree to which the cells are open is exceptionally high and the permeability goes beyond that of the comparison foams.

TABLE 5

| Example | Air Permeability | Cell Structure | Die-Cuttability |
|---|---|---|---|
| 5 | 40 | fine, regular | very poor |
| 6 | 60 | slightly coarsened, regular | very poor |
| 7a | | collapse because of deficient stabilization | |
| 7b | 180 | coarsened, irregular | very good |
| 8k | 10 | fine, regular | good/satisfactory |
| l | 10 | slightly coarsened, regular | very good |
| m | 10 | fine, regular | very good |
| n | 20 | fine, regular | good/satisfactory |
| o | 10 | fine, regular | very good |
| p | 20 | fine, regular | good/satisfactory |
| q | 20 | fine, slightly irregular | good |
| r | 10 | fine, regular | satisfactory |
| s | 10 | fine, regular | very good |
| t | 20 | coarsened, irregular | very good |

Examples 7a and 7b show that, in formulations with an increased water content (low density), stable foams can be produced only by very high concentrations of organic surfactants. Accordingly, the preparation of polyester urethane foams with an even lower density is practically impossible with them.

Examples 8k–s confirm that foams with an excellent die-cuttability at the same time are stabilized very well (stabilizer used in low concentrations) can be produced by means of the inventive stabilizer mixture. The advantages of the organic surfactant (Example 7b: die-cuttability) are accordingly combined with those of the polyoxyalkylene-polysiloxane block copolymer (Examples 5, 6: cell structure, stabilization) even at higher water contents.

Here also, the use of the inventive stabilizer mixture results in foams with an exceptionally high open cell structure, which goes far beyond that of comparison foams.

We claim:

1. A method for the preparation of flexible polyester polyurethane foam, wherein at least difunctional polyesterol is reacted with at least difunctional organic isocyanate in the presence of catalyst and a stabilizer mixture of organic and organosilicon compounds, water and optionally blowing agents comprising preparing the flexible polyester polyurethane foam in the presence of a stabilizer mixture, which comprises
   a) a (meth)allyl polyoxyalkylene ether polymer or its copolymer with vinyl monomers and
   b) a polyoxyalkylene-polysiloxane mixed block copolymer,
wherein the ratio by weight of a:b is 1:9 to 9:1.

2. The method of claim 1, in which the weight ratio of a:b of the stabilizer mixture is 1:3 to 3:1.

3. The method of claim 1 or 2, in which component a) of the stabilizer mixture is obtainable by polymerization of a compound of the formula

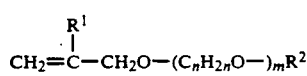

$$CH_2=C(R^1)-CH_2O-(C_nH_{2n}O-)_mR^2$$

or by the copolymerization of said compound with up to 90 mole percent of a vinyl compound of the formula

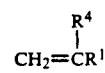

$$CH_2=CR^1(R^4)$$

wherein
$R^1$ is a hydrogen or methyl group
$R^2$ is a hydrogen group or a hydrocarbon group with 1 to 8 carbon atoms or the —CONH—$R^3$ or —CO—$R^3$ group, in which $R^3$ is a hydrocarbon group with 1 to 8 carbon atoms,
$R^4$ is the $R^5$—COO— or the —COO$R^5$ group or

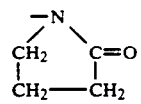

$$\begin{array}{c} -N \\ / \quad \backslash \\ CH_2 \quad C=O \\ | \quad\quad | \\ CH_2-CH_2 \end{array}$$

in which
$R^5$ is an alkyl group with 1 to 18 carbon atoms,
n has a value of 2 to 3 in the average polymer molecule and an absolute numerical value of 2, 3 or 4 and
m has a value of 1 to 100 in the average polymer molecule.

4. The method of claim 3, in which the groups, subscripts and superscripts of component a) of the stabilizer mixture have the following meaning:
$R^1$ is H,
$R^2$ is a hydrocarbon group with 1 to 4 carbon atoms,
$R^4$ is $R^5$—COO— or —COO$R^5$, wherein $R^5$ is a methyl or ethyl group,
n has an absolute value of 2 and 3 and an average value of 2.2 to 2.8,
m has an average value of 10 to 70.

5. The method of claim 1 or 2, in which component b) of the stabilizer mixture is a block copolymer of the formula

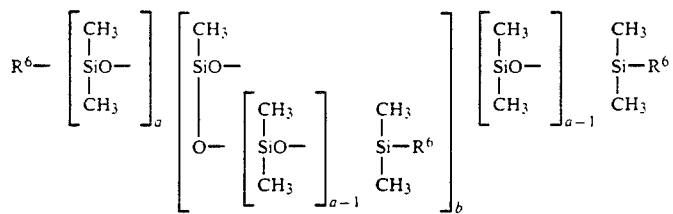

or of the formula $$R^7-\left[\begin{array}{c}CH_3\\|\\SiO-\\|\\CH_3\end{array}\right]_c\left[\begin{array}{c}CH_3\\|\\SiO-\\|\\R^7\end{array}\right]_d\begin{array}{c}CH_3\\|\\Si-R^7\\|\\CH_3\end{array}$$

wherein
- $R^6$ is a methyl group or a polyether group of the average formula $-O-(C_xH_{2x}O-)_yR^8$, in which
- $x$ has a value of 2 to 3 in the average polymer molecule and an absolute numerical value of 2, 3 or 4,
- $y$ has a value of 5 to 50 in the average polymer molecule,
- $R^8$ is a hydrogen or alkyl group with 1 to 6 carbon atoms,
- $R^7$ is a methyl group or a polyether group of the average formula $-(CH_2)_3O-(C_pH_{2p}O-)_qR^9$, in which
- $p$ has a value of 2 to 3 in the average polymer molecule and an absolute numerical value of 2, 3 or 4,
- $q$ has a value of 5 to 50 in the average polymer molecule and
- $R^9$ is a hydrogen or alkyl group with 1 to 6 carbon atoms, with the proviso that, in the average polymer molecule, at least one $R^6$ or $R^7$ group must be a polyether group and in the average polymer molecule
- a has a value of 1 to 50,
- b has a value of 0 to 10,
- c has a value of 2 to 50 and
- d has a value of 2 to 40.

6. The method of claim 5, in which the groups, subscripts and superscripts of component b) of the stabilizer mixture have the following meanings:
- $R^8$ and $R^9$ are each an alkyl group with 1 to 4 carbon atoms,
- a has an average value of 2 to 20,
- b has an average value of 0 to 2,
- c has an average value of 2 to 25,
- d has an average value of 2 to 25,
- x and p have absolute values of 2 and 3 and an average value of 2.0 to 2.7 and
- y and q have average values of 8 to 40.

7. The method of claim 1 or 2, in which the stabilizer mixture additionally contains a solubilizer in an amount effective to solubilize the stabilizer mixture.

8. The method of claim 3, in which the stabilizer mixture additionally contains a solubilizer in an amount effective to solubilize the stabilizer mixture.

9. The method of claim 5, in which the stabilizer mixture additionally contains a solubilizer in an amount effective to solubilize the stabilizer mixture.

* * * * *